Oct. 23, 1962  M. J. UDY  3,060,250
SEALER-COOLER STRUCTURE FOR FURNACE ELECTRODES
Filed Feb. 5, 1959
Fig. 3.
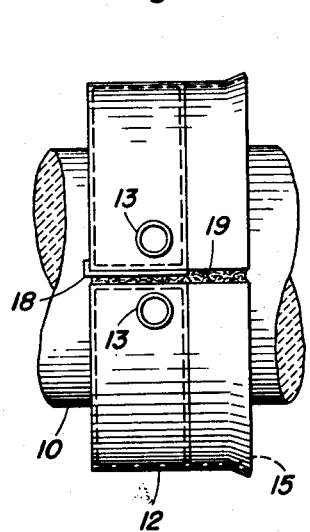
Fig. 2.
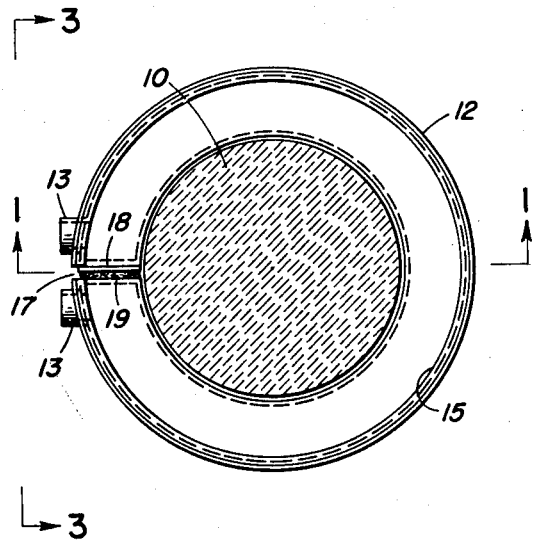
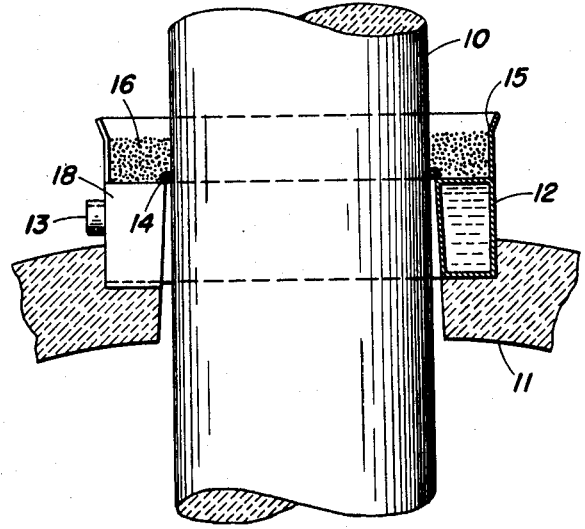
Fig 1.
INVENTOR
Marvin J. Udy
BY
Charles J. Elderkin
ATTORNEY United States Patent Office 3,060,250
Patented Oct. 23, 1962

3,060,250
SEALER-COOLER STRUCTURE FOR
FURNACE ELECTRODES
Marvin J. Udy, Niagara Falls, N.Y., assignor to Strategic Material Corporation, New York, N.Y., a corporation of New York
Filed Feb. 5, 1959, Ser. No. 791,311
1 Claim. (Cl. 13—17)

This invention relates to a novel structure intended to provide slidable-sealing in combination with cooling for electrode openings of the type utilized in the roof or other electrode entry point in arc electric furnaces. In particular, the invention involves the provision of a sealer-cooler structure for the roof-opening or openings in arc electric furnaces which is adapted to surround an electrode projecting through the roof to the smelting zone of the furnace and provide continuous cooling of the roof refractories against the influence of heat generated by the electrode, and to seal the electrode opening against the ingress and egress of gases without interfering with the free vertical movement of the electrode required during normal operation of the furnace.

Heretofore, the formation of electrode openings in the roof structures of some covered arc-electric furnaces has been effected through use of simple molded refractories adapted to form a close-fitting circular opening through which an electrode can be moved into and out of the smelting chamber, or refractory-lined openings of this type are further sealed with less dense materials such as asbestos cement or fireclay which are replaced from time to time as they break down under influence of the high-temperatures and constant electrode movement. Alternatively, other furnace structures utilize water-cooled jacketings or roof rings of various cross-sectional configurations which are set in the refractory bricks and designed to encircle the electrodes at their points of passage through the furnace roof.

Significantly, much difficulty has been experienced in the maintenance and upkeep of furnace roof structures due to the design problems incidental to electrode passage through the roofs, and the actual operating efficiency of many furnaces has been impaired due to difficulties arising at this particular point in the over-all furnace structures. For example, it often occurs that vapors of metals and other materials present within a charge undergoing smelting will condense adjacent the electrode openings and gradually bridge over to the electrode, freezing the same against free movement and usually resulting in breaking of the electrode with consequent shut-down time and carbon contamination of the material undergoing smelting due to the electrode stub entering the melt. In the case of conventional water-cooled roof rings, a great deal of difficulty arises through warping and leaking due to the opening of welds caused by the high temperatures and, for the most part, only partial or imperfect sealing of the furnace chamber can be realized with these types of structures. That is to say, it is impossible to effect tight sealing of the roof ring to an electrode and, hence, difficult to maintain true pressure conditions or a constant reducing atmosphere within the furnace chamber because of the ingress and egress of gases, including air, through the narrow clearance demanded for free electrode movement under control of automatic voltage regulators and hydraulic lifts.

The sealer-cooler structure of the present invention overcomes the major disadvantages inherent in known units of this same general class by providing a water-cooled jacket or roof ring in combination with a reservoir or supply source for a comminuted or finely-divided refractory material such as sand or quartz or the like, which is positioned to normally seal the clearance space between the roof ring and electrode, but which is free to enter this space in a slight trickle or stream upon movement of the electrode, for example, thereby serving to prevent freezing of the electrode to the roof ring under action of condensed gases. Specifically, the sealer-cooler structure of the invention comprises a segmental circular water jacket or roof ring recessed within the refractory material of the roof and substantially surrounding the electrode passageway, but spaced therefrom a sufficient distance to avoid fouling of the same by the electrode or undue warpage due to excessive heat generated in close proximity to the surface of the electrode. Above the roof ring and positioned in substantially circular conformity to the ring itself, there is provided a top-opening hopper closed around its outer periphery but open adjacent the electrode and adapted to be filled with a finely-divided refractory substance such as sand, such that a level of sand is maintained directly against the peripheral surface of the electrode and is provided with restricted access into the critical space between the electrode and water-cooled roof ring. In this manner, there is obtained efficient cooling serving to prevent oxidation of the electrode, per se, and cooling of the roof refractories, as well as efficient sealing of the electrode opening without danger of electrode seizure or freezing of the type which characteristically occurs with known sealant structures.

It is believed that my invention will be best understood by reference to the following detailed description of one embodiment of the same taken in conjunction with the accompanying drawing, wherein:

FIG. 1 is an elevational view in cross-section taken along line 1—1 of FIG. 2 showing the sealer-cooler structure of the invention positioned in operative relationship with respect to a furnace electrode;

FIG. 2 is a plan view of the sealer-cooler illustrated in FIG. 1 showing constructional details of an air-gap provided in the same for purposes of minimizing magnetic inductance; and FIG. 3 is a side view of the sealer-cooler further illustrating constructional details of the magnetic air gap.

With reference to FIG. 1 of the drawing, the furnace electrode has been depicted in segmental form by reference numeral 10, passing through the conventional circular opening provided in the roof refractory 11. Set in the upper portion of the roof refractory and substantially surrounding the electrode is a water-cooled roof ring 12 of segmental, hollow, cylindrical configuration. Roof ring 12 is of welded construction adapted to receive cooling water therein in continuous circulation through the connections 13 (FIG. 3) which open into the hollow center of the ring. At its inner peripheral surface adjacent the furnace electrode 10, the roof ring is tapered downwardly away from the electrode to the natural extension provided by the normal roof refractory 11. In actual practice, it is found that a clearance of approximately 3/32 to 1/4 inch at the topmost closest point of the roof ring to the electrode, tapering to a clearance of about 1/2 inch at the bottom edge of the roof ring, provides a satisfactory clearance space between the ring and electrode.

As best seen by reference to FIG. 1 of the drawing, the narrowmost top clearance between roof ring 12 and electrode 10 is lightly plugged by means of a simple loop of asbestos rope 14 or any other suitable filtering medium which will not offer too great a resistance to the ingress of sand into the gap between the ring and electrode. In actual practice, I find that asbestos rope is ideally suited for use as the filtering medium 14, although glass fiber and similar non-conductive, temperature-resistant materials can be employed for this purpose.

Alternatively, it is entirely possible to effect adequate sealing of this gas solely by means of the closely compacted column of sand or other comminuted refractory material piled above the gap.

Mounted on top of the roof ring 12, there is provided a top-opened hopper 15 which surrounds the entire electrode 10 and is adapted to receive a charge of sand 16 or other comminuted refractory material in direct contact against the peripheral portions of the electrode 10. The sand is normally maintained free of the gap between electrode 10 and roof ring 12 by means of the filtering medium 14, but it can trickle into the gap under action of electrode movement or gas pressure against the filtering medium 14 and the column of sand thereabove, thereby serving to maintain the gap free of condensed solids. The supply of sand 16 is replenished as required by simply filling hopper 15 from above.

With reference to FIGS. 2 and 3 of the drawings, it will be seen that the normal circumferential area of roof ring 12 and the overlying hopper 15 is broken to provide a slight magnetic air gap 17, and one end of the ring is further fitted with a copper plate 18 extending across substantially the entire air-gap. This joint between the ends of the roof ring and hopper is then sealed by filling with asbestos and clay 19 or any other suitable material.

It should be noted that in situations in which there exists a tendency towards lateral play in the furnace electrodes due to the hydraulic system or other factors, it is desirable to mount the cooler-sealer unit of the invention flush with the top surface of the roof such that it may move with the sideward motion of the electrodes, or, alternatively, the recessed cut-out in the roof refractory may be made slightly large to permit such lateral movement without straining the electrodes.

Having thus described the subject matter of my invention, what it is desired to secure by Letters Patent is:

A sealing and cooling device adapted to permit adjustable penetration therethrough of an electrode into the interior of an arc electric furnace and surrounding said electrode, that comprises, a substantially cylindrical hollow ring member positioned to surround said electrode in spaced relation from the same sufficient to define a relatively narrow clearance for the passage of the electrode therethrough, means communicating with the interior of said ring member for supplying the same with a circulating flow of a cooling medium, a substantially cylindrical hopper unit mounted around the top surface of said ring member and charged with a depth of comminuted refractory material with the same flowing into direct contact against the peripheral surface of an electrode positioned within said ring member, pressure-responsive filter means providing for continuous restricted flow of said comminuted refractory material into and through the narrow clearance between said ring member and electrode under action of furnace gases, said ring member and hopper being provided with a relatively narrow magnetic air gap at one point around their periphery, and refractory means filling said air gap to seal the same against the ingress and egress of gases from the interior of said furnace.

References Cited in the file of this patent

UNITED STATES PATENTS

| | | |
|---|---|---|
| 846,521 | Stevens | Mar. 12, 1907 |
| 908,407 | Heroult | Dec. 29, 1908 |
| 1,444,980 | Moore | Feb. 13, 1923 |
| 1,508,486 | Tharoldsen | Sept. 16, 1924 |

FOREIGN PATENTS

| | | |
|---|---|---|
| 379,612 | Germany | Aug. 28, 1923 |

UNITED STATES PATENT OFFICE

CERTIFICATE OF CORRECTION

Patent No. 3,060,250                            October 23, 1962

Marvin J. Udy

It is hereby certified that error appears in the above numbered patent requiring correction and that the said Letters Patent should read as corrected below.

Column 2, line 59, for "3/32 to 1/4 inch" read -- 1/32 to 1/4 inch --; column 3, line 2, for "gas" read -- gap --.

Signed and sealed this 24th day of September 1963.

(SEAL)
Attest:

ERNEST W. SWIDER
Attesting Officer

DAVID L. LADD
Commissioner of Patents